United States Patent
Reeser et al.

(10) Patent No.: US 7,894,982 B2
(45) Date of Patent: Feb. 22, 2011

(54) METHOD AND SYSTEM FOR LINKED VEHICLE NAVIGATION

(75) Inventors: Brad T. Reeser, Lake Orion, MI (US); Russell A. Patenaude, Macomb Township, MI (US); Shpetim S. Veliu, Livonia, MI (US); Anthony J. Sumcad, Southfield, MI (US)

(73) Assignee: General Motors LLC, Detroit, MI (US)

( * ) Notice: Subject to any disclaimer, the term of this patent is extended or adjusted under 35 U.S.C. 154(b) by 1184 days.

(21) Appl. No.: 11/194,308

(22) Filed: Aug. 1, 2005

(65) Prior Publication Data
US 2007/0027614 A1 Feb. 1, 2007

(51) Int. Cl.
*G01C 21/26* (2006.01)
(52) U.S. Cl. .................. 701/200; 701/207; 340/995.12
(58) Field of Classification Search ................. 701/200, 701/207; 340/995.12
See application file for complete search history.

(56) References Cited

U.S. PATENT DOCUMENTS

| | | | |
|---|---|---|---|
| 4,812,843 A | 3/1989 | Champion | |
| 6,032,097 A * | 2/2000 | Iihoshi et al. | 701/96 |
| 6,301,530 B1 * | 10/2001 | Tamura | 701/23 |
| 6,356,820 B1 * | 3/2002 | Hashimoto et al. | 701/23 |
| 6,397,149 B1 * | 5/2002 | Hashimoto | 701/300 |
| 6,542,818 B1 | 4/2003 | Oesterling | |
| 6,611,755 B1 * | 8/2003 | Coffee et al. | 701/213 |
| 6,643,587 B2 | 11/2003 | Brodie | |
| 6,879,910 B2 * | 4/2005 | Shike et al. | 701/208 |
| 6,925,378 B2 | 8/2005 | Tzamaloukas | |
| 7,183,666 B2 * | 2/2007 | Arakawa et al. | 307/10.2 |
| 7,283,810 B1 * | 10/2007 | Arakawa et al. | 455/414.1 |
| 7,286,611 B2 * | 10/2007 | Kamemura et al. | 375/267 |
| 7,286,825 B2 * | 10/2007 | Shishido et al. | 455/435.1 |
| 7,444,227 B2 * | 10/2008 | Tengler et al. | 701/100 |
| 2003/0236818 A1 * | 12/2003 | Bruner et al. | 709/200 |
| 2004/0142678 A1 | 7/2004 | Krasner | |
| 2004/0148083 A1 * | 7/2004 | Arakawa et al. | 701/50 |
| 2005/0215200 A1 | 9/2005 | Oesterling | |
| 2005/0288986 A1 * | 12/2005 | Barts et al. | 705/9 |
| 2007/0027614 A1 * | 2/2007 | Reeser et al. | 701/200 |

FOREIGN PATENT DOCUMENTS

WO  WO 96/24915  8/1996

OTHER PUBLICATIONS

U.S. Appl. No. 11/194,308, Reeser.
U.S. Appl. No. 11/191,584, Kamdar.
U.S. Appl. No. 11/138,985, Glaza.
U.S. Appl. No. 11/063,481, Glaza.
U.S. Appl. No. 10/983,773, Glaza.
U.S. Appl. No. 11/145,662, Glaza.
U.S. Appl. No. 11/014,498, Fraser.

* cited by examiner

*Primary Examiner*—Thomas G Black
*Assistant Examiner*—Wae Louie
(74) *Attorney, Agent, or Firm*—Dierker & Associates, P.C.

(57) ABSTRACT

A method of navigating a plurality of vehicles includes receiving vehicle identifications from the plurality of vehicles at a central location. A travel group is formed based on the received vehicle identifications. Global positioning information is received from at least one vehicle associated with the travel group at the central location. The received global positioning information is transmitted from the central location to at least one vehicle associated with the travel group.

18 Claims, 4 Drawing Sheets

| Vehicle #: | Vehicle ID: | ID Type: | Contact Method: | Group Member: | Position: |
|---|---|---|---|---|---|
| 1 300 | GN10238845843334 301 | VIN | Live advisor /MVCU | Yes | Leader |
| 2 302 | follower/groupie 303 | Username/password | Web login | Yes | Follower |
| 3 304 | OX31425 305 | Membership code | Call center req. /MVCU | Yes | Follower |
| 4 306 | leftout/almost 307 | Username/password | Phone call /exemption | Yes | Follower |

METHOD AND SYSTEM FOR LINKED VEHICLE NAVIGATION

FIELD OF THE INVENTION

This invention relates generally to data transmissions over a wireless communication system. More specifically, the invention relates to a strategy for linked vehicle navigation.

BACKGROUND OF THE INVENTION

Many passenger vehicles now incorporate an integrated communication system, such as a Mobile Vehicle Communication Units (MVCU), providing a variety of fee-based subscription services in a mobile environment including navigational assistance. The MVCU is typically a vehicle telematics device including a cellular radio, satellite transceiver, and/or global positioning capabilities. Typically, a radio communication link is established between the MVCU and a call center through a Wide Area Network (WAN), using a node of the WAN in the vicinity of the MVCU.

Off-board navigation is a means of providing turn-by-turn directions with a navigation device that obtains a route from a remote source (i.e., transmitted to the MVCU from the call center via the WAN). Currently, users of navigation devices who seek directions to a destination request the information individually from a service provider, navigation system, web site, etc. In certain instances, multiple users traveling in separate vehicles wish to travel as a travel group along a route. As such, each member of the travel group seeking directions must individually receive off-board navigational instructions for the route.

In certain instances, members of a travel group do not have a route established. Rather, the group members wish to keep track of each others progress. This would be extremely useful should there be any change in plans, weather conditions, or other updates, during their travels. As such, it would be desirable to provide a strategy for keeping track of group member's progress.

It is an object of this invention, therefore, to provide a strategy for linking vehicle navigations, and to overcome the deficiencies and obstacles described above.

SUMMARY OF THE INVENTION

One aspect of the invention provides a method of navigating a plurality of vehicles. The method includes receiving vehicle identifications from the plurality of vehicles at a central location. A travel group is formed based on the received vehicle identifications. Global positioning information is received from at least one vehicle associated with the travel group at the central location. The received global positioning information is transmitted from the central location to at least one vehicle associated with the travel group.

Another aspect of the invention provides a computer usable medium including a program for navigating a plurality of vehicles. The computer usable medium includes computer readable program code for receiving vehicle identifications from the plurality of vehicles at a central location, and computer readable program code for forming a travel group based on the received vehicle identification. The medium further includes computer readable program code for receiving global positioning information from at least one vehicle associated with the travel group at the central location; and computer readable program code for transmitting the received global positioning information from the central location to at least one vehicle associated with the travel group.

Another aspect of the invention provides a system for navigating a plurality of vehicles. The system comprising includes means for receiving vehicle identifications from the plurality of vehicles at a central location, and means for forming a travel group based on the received vehicle identification. The system further includes means for receiving global positioning information from at least one vehicle associated with the travel group at the central location, and means for transmitting the received global positioning information from the central location to at least one vehicle associated with the travel group.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 illustrates a table of vehicle identification from four unique vehicles, in accordance with one embodiment of the present invention;

DETAILED DESCRIPTION OF THE PRESENTLY PREFERRED EMBODIMENTS

Figure 1:
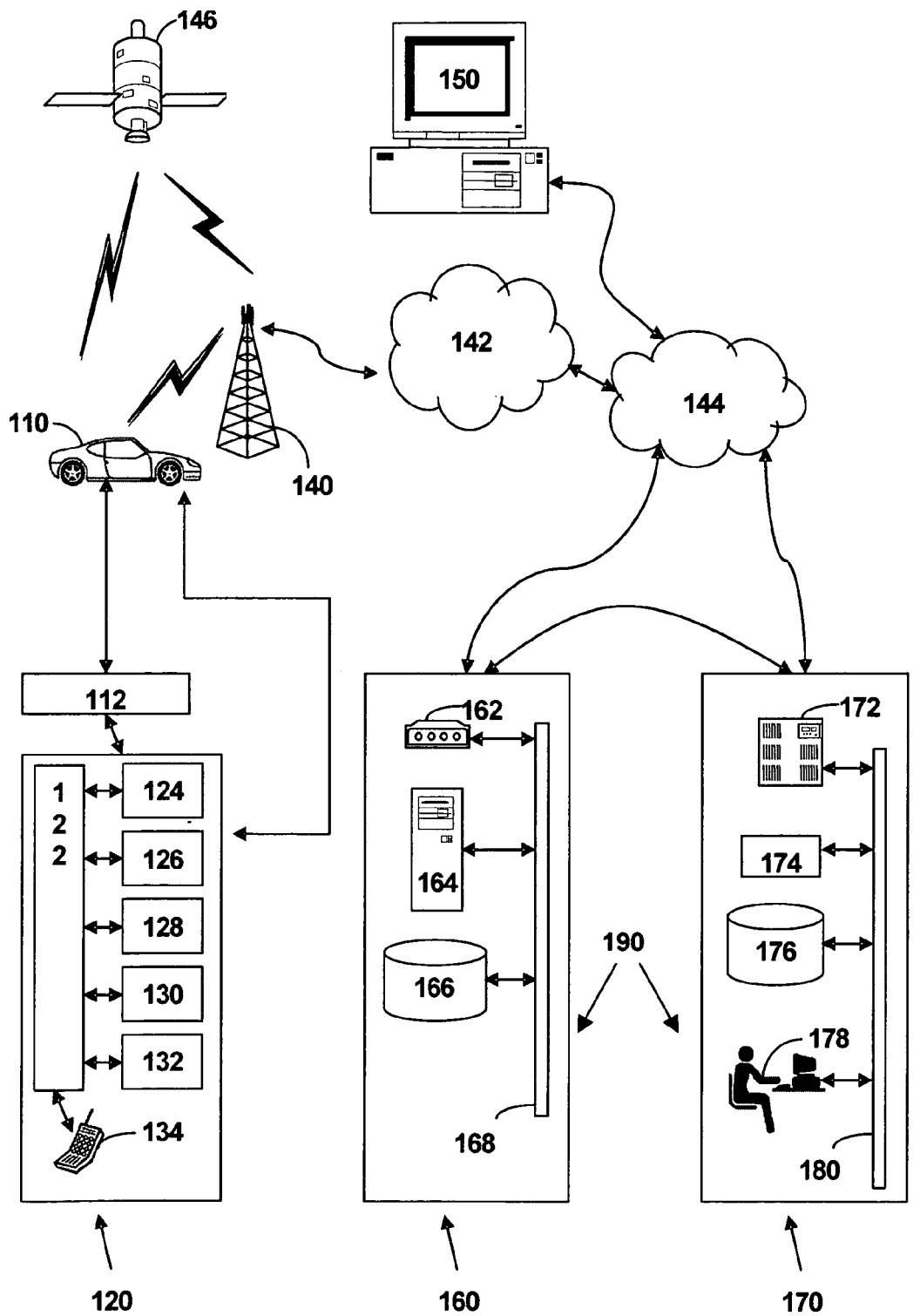
FIG. 1 illustrates a system for navigating a plurality of vehicles, in accordance with one embodiment of the present invention.

FIG. 1 illustrates a system navigating a plurality of vehicles, in accordance with one embodiment of the present invention and shown generally by numeral 100. One or more other vehicles, which are part of a same travel group, are linked to the system 100 in a like manner. In such a manner, a system for navigating a plurality of vehicles is provided (described below). Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 is implemented as a motor vehicle, a marine vehicle, or as an aircraft, in various embodiments. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or communications device 134, such as in-vehicle or mobile cellular phone. In other embodiments, telematics unit 120 is implemented without one or more of the above listed components such as, for example, speakers 132. Telematics unit 120 may include additional components not relevant to the present discussion.

In one embodiment, processor 122 is implemented as a microcontroller, controller, host processor, or vehicle communications processor. In one embodiment, processor 122 is a digital signal processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides latitudinal and longitudinal coordinates of the vehicle responsive to a GPS broadcast signal received from one or more GPS satellite broadcast systems 280, illustrated in FIG. 4. Communications device 134 is capable of, for example, digital, dual-mode (e.g., analog and digital), dual-band, multi-mode or multi-band communications, short messaging service (SMS), direct link to another communications device; Bluetooth® wireless specification, and shortwave communication.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. Data packets include travel information. In an example, digital map information data packets received by the telematics unit 120 from the call center 170 are implemented by processor 122 to determine a route correction.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In another or the same embodiment, travel information content and transmission characteristics are configurable through the web-hosting portal 160.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160. In another example, a client utilizes computer 150 to configure travel information content and transmission characteristics.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance, and diagnostic services for a mobile vehicle. In another embodiment, web server 164 further includes data for managing turn-by-turn navigational instructions. In another embodiment, web server 164 includes a processor capable of forming a travel group based on received vehicle identifications.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

In one embodiment, central location 190 includes web-hosting portals 160 and call center 170. Central location 190 provides functionality for receiving vehicle identifications from the MVCU 110, communications device 134, client computer 150, and other sources. In addition, the central location 190 provides functionality for forming a travel group, and receiving/sending global positioning information. Those skilled in the art will recognize that the central location 190 may include other functionalities and/or members and is not limited to the example provided herein. In addition, central location 190 need not be located in a single location.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. In one embodiment, communication services manager 174 includes at least one digital and/or analog modem.

Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, web-hosting portal 160, and land network 144. Communication services manager 174 transmits user-preference and other data such as, for example., primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to service requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
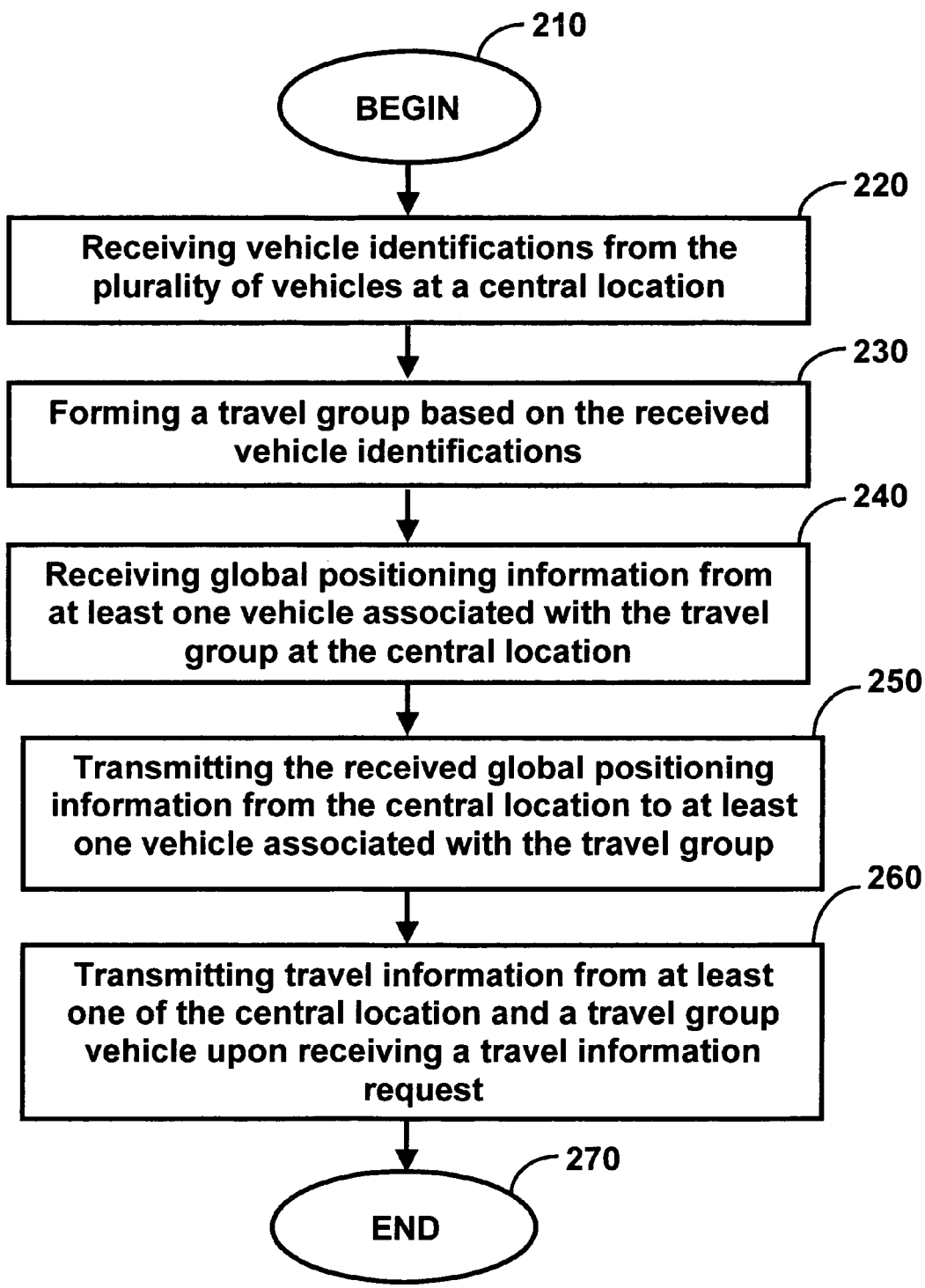
FIG. 2 illustrates a flowchart of a method for navigating a plurality of vehicles, in accordance with one embodiment of the present invention.

FIG. 2 illustrates a flowchart of a method 200 representative of one embodiment of a method of navigating a plurality of vehicles. Method 200 begins at 210. The present invention also takes the form of a computer usable medium including a program for navigating a plurality of mobile vehicles in accordance with the present invention. The program, stored in the computer usable medium, includes computer program code for executing the method steps described and illustrated in FIG. 2. The program and/or portions thereof are, in various embodiments, stored and executed by the MVCU 110, communications device 134, web-hosting portal 160, call center 170, central location 190, and associated (sub-) components as needed to navigate the vehicles.

At step 220, vehicle identifications are received from a plurality of vehicles at the central location 190. Alternatively, the vehicle identifications are received from at least one user, via a network or telephone interface at the central location 190. In one embodiment, the central location 190 includes the web-hosting portal 160, the call center 170, or both. In another embodiment, the central location 190 is one or more locations capable of performing the steps in accordance with the present invention. In one embodiment, the vehicle identification includes unique identifying information specific to each vehicle. The vehicle identification is transmissible via various wireless and non-wireless protocols, such as satellite-radio broadcasts, the Internet, and other communication protocols. The vehicle identifications is sent from the MVCU 110, communications device 134, client computer 150, and the like, to the central location 190. Examples of vehicle identification include, but are not limited to, a vehicle identification number (VIN), serial number of a device, uniquely assigned number, a membership code, a frequency code, and a username/password.

Vehicle identifications 301, 303, 305, 307 from vehicles 300, 302, 304, 306, an example of which is shown in FIG. 3, are received at the central location 190. For example, vehicle identification 301 from vehicle 300 is a VIN received via a call placed to a live communication services advisor 178 at the call center 170 communicated by the MVCU 110. Vehicle identification 303 from vehicle 302 is a username/password received via the web hosting portal 160 from client computer 150. An exemplary username/password pair "follower/groupie" is illustrated as vehicle identification 303 in FIG. 3, although any username/password can be used to practice the invention. Vehicle identification 305 from vehicle 304 is a membership code communicated by the MVCU 110 after the call center 170 has requested it and the vehicle user has granted permission. Vehicle identification 307 from vehicle 306 is a username/password received via a phone call placed to call center 170. An exemplary username/password pair "leftout/almost" is illustrated as vehicle identification 307 in FIG. 3, although any username/password can be used to practice the invention. Those skilled in the art will recognize that vehicle identifications and the means by which they are received may vary and are not limited to the examples provided herein.

At step 230, a travel group 320 is formed based on the received vehicle identifications 301, 303, 305, 307. In one embodiment, a travel group request 290 is received at the central location 190. The request, for example, includes a request to form a travel group 320. The request specifies which vehicles or groups of vehicles are authorized to join the travel group 320 (i.e., by providing the proper authorization information). The travel group request 290 is sent from the MVCU 110, communications device 134, client computer 150, or by other means.

After the travel group request 290 has been received at the central location 190, the vehicle identifications 301, 303, 305, 307 are associated to the travel group 320. In one embodiment, the vehicle identifications 301, 303, 305, 307 are verified by, for example, using a password along with the username, verifying the VIN number and/or membership code, or other authentication means. In one embodiment, the verification process prevents the broadcast of travel group information to unwanted recipients as well as prevents any unwanted vehicles from joining the travel group 320.

As an example, vehicle 300 forms a travel group 320 using the communication services advisor 178 and stipulate that vehicles 302 and 304 are allowed to join the travel group 320. Vehicle 300 provides means for specifying which vehicles are allowed to join the travel group 320 (i.e., by providing a group password and/or the specific vehicle identification of the vehicle(s) allowed to join, etc.). Vehicle 302 is added to the travel group 320 upon receipt and verification of appropriate vehicle identification 303 (i.e., in this case, an appropriate entry of a username/password via the client computer 150). Vehicle 304 is added to the travel group 320 after a request is issued by the call center 170 to the vehicle 304 requesting addition to the travel group 320 and subsequent transmission and verification of its vehicle identification 305. Vehicle 306 is denied permission to the travel group 320 as it cannot provide an appropriate vehicle identification 307 in accordance with the travel group request 290 issued by vehicle 300. Optionally, a notification is sent to vehicle 300 of vehicle's 306 desire to join the travel group 320. Upon receipt of the notification, vehicle 300 adjusts the travel group 320 to then allow addition of vehicle 306 to the travel group 320. Vehicle 306 is notified of its addition to the travel group 320.

In one embodiment, the travel group 320 includes a leader and at least one follower, which is stipulated when the travel group 320 is formed or at another time. For example, vehicle 300 is deemed the leader and vehicles 302, 304, and 306 are deemed the followers. In one embodiment, the leader and one of the followers may change positions during group travel. For example, if a follower passes the leader or if the leader no longer wished to assume that role, the follower will become the new leader and the leader will become a follower. It should be noted that the terms "leader" and "follower" as used herein to include leading and following in a spatial sense as well as leading and following in a guiding sense.

Figure 4:
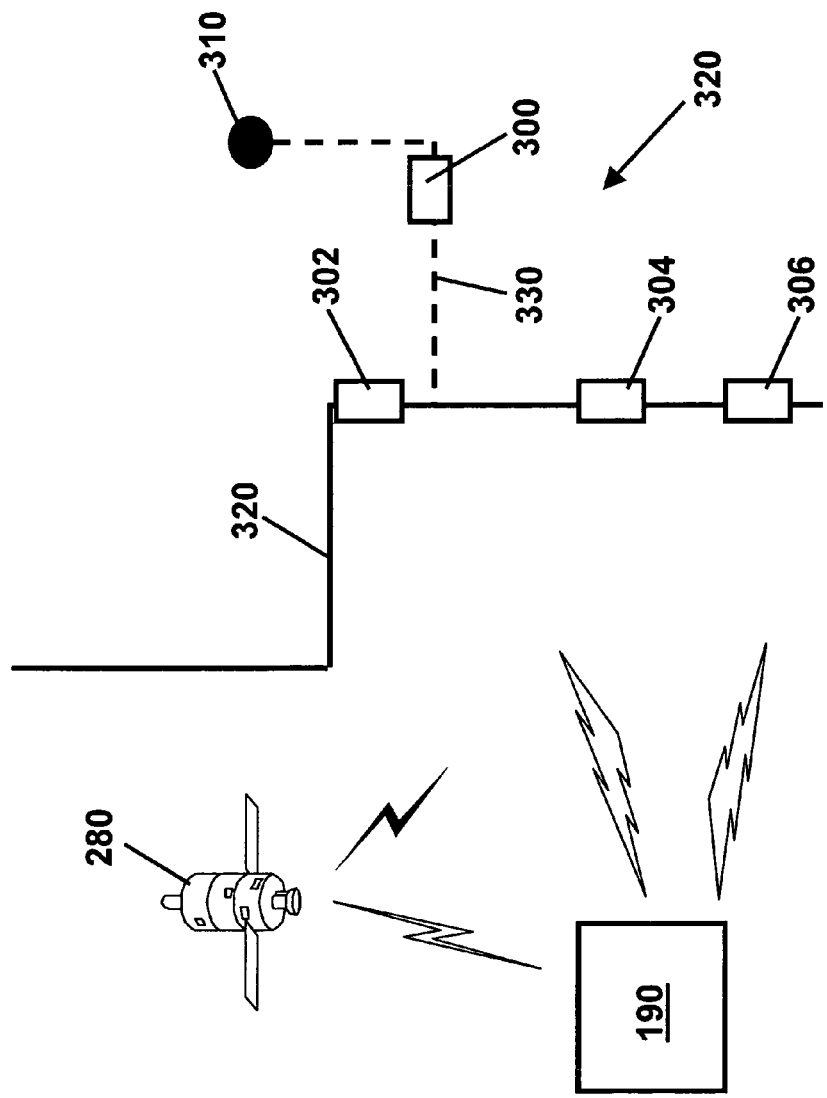
FIG. 4 illustrates a travel group traveling along a planned route and an alternate route, in accordance with one embodiment of the present invention.

At step 240, global positioning information is received from at least one vehicle associated with the travel group 320 at the central location 190. In one embodiment, the vehicle location is provided by the GPS unit 126 of each vehicle of the travel group 320 and transmitted to the central location 190 via the MVCU 110. Referring to FIG. 4, GPS information is received by the central location 190 from vehicles 300, 302, 304, 306.

At step 250, the received global positioning information is transmitted from the central location 190 to at least one vehicle associated with the travel group 320. In one embodiment, global positioning information received previously from vehicles 300, 302, 304, 306 is sent to vehicles 300, 302, 304, 306 and received by the MVCU 110 so as to provide a real-time positioning of the vehicle one relative to another. A digital display, auditory signal, or other means communicates to a vehicle user the GPS information of the other vehicle(s) in the travel group 320.

At step 260, in one embodiment, travel information is transmitted from at least one of the central location 190 and a travel group vehicle 300, 302, 304, 306 upon receiving a travel information request. For example, vehicle 304 requests an itinerary from vehicle 300 or central location 190 upon which vehicle 300 or central location 190 transmits the itinerary to one or more of the vehicle 302, 304, 306. In another or the same embodiment, the travel information is transmitted automatically. For example, vehicle 300 or central location 190 sends a route change notification and new route information to the vehicles 302, 304, 306 upon deviating from the planned route 320 to the alternate route 330. Certain time periods or events are configurable so as to trigger an automatic transmission of travel information. The conditions and the periodicity of automatically transmitted travel information may vary and be defined based on a variety of factors and conditions.

In one embodiment, travel information is sent from the central location 190 to the vehicles 300, 302, 304, 306. In another or the same embodiment, travel information is transmitted directly between vehicles 300, 302, 304, 306. Travel information is shared directly between vehicles without the need of communication with the central location 190 using the communications device 134 or another communications platforms or strategy. In various embodiments, the travel information is exchanged by, for example, digital, dual-mode (e.g., analog and digital), dual-band, multi-mode or multi-band communications, short messaging service (SMS), direct link to another communications device; a FCC Part 15 configured device, Bluetooth® wireless specification, and short-wave communication. In another example, the travel information is exchanged using an ad-hoc peer-to-peer network formed by wireless communications devices within each vehicle. In one embodiment, a digital display, auditory signal, or other means provides a vehicle user of the travel information of the central location 190 and the other vehicle(s) in the travel group 320.

In one embodiment, the travel information includes an estimated time of arrival (ETA) of a travel group vehicle. The ETA is calculated by a strategy known to one skilled in the art by, for example, using the current positions of a vehicle and an endpoint while taking other factors into account (e.g., speed limits, traffic and weather conditions, likely stops, etc.). The endpoint may be a fixed point (e.g., a point-of-interest) or a moving point (e.g., another vehicle). Referring to FIG. 4, the ETA can be calculated between the leader vehicle 300 and an endpoint 310.

In one embodiment, the travel information includes directions from a vehicle to another fixed or moving endpoint. For example, the directions can be to a point-of-interest, a detour, or another vehicle. This feature is useful should one group member get lost, experience a mechanical failure, decide to visit another point-of-interest, or try to make their way to the group leader or follower. Referring to FIG. 4, turn-by-turn directions can be provided from follower vehicle 302 to the leader vehicle 300, which has diverted from a planned route 320. As such, follower vehicle 302 will avoid unnecessarily traveling in the wrong direction.

In one embodiment, the travel information includes distance between travel group 320 members. The distance is calculated by method known to those skilled in the art and provide, along with the ETA, an idea of the time and space between two or more vehicles (e.g., between the leader and a follower). Referring to FIG. 4, distance can be provided from follower 308 and the leader vehicle 300. This can be combined, for example, with the vehicle speeds to estimate a catch-up time.

In one embodiment, the travel information includes route information. A planned route 320 is set up during the formation of the travel group 320 or at another time (i.e., using the client computer 150 or the communication services advisor 178). The route is determined by methods known in the art and includes points-of-interest, planned stops, and other features. In some instances, the route will change. For example, a member of the group may want to or has already changed the route. As such, a notification that a route change is imminent or has already been made can be transmitted to the other vehicles. A new route may then be planned (e.g., at the central location 190) and made available to the vehicles 300, 302, 304, 306 to reflect the route change(s). As shown in FIG. 4, the leader vehicle 300 has diverted from the planned route 320 to an alternate route 330.

In one embodiment, the travel information includes itinerary information. An itinerary is set up during the formation of the travel group 320 or at another time (i.e., using the client computer 150 or the communication services advisor 178). The itinerary includes points of interest, expected times of departure/arrival, etc. In some instances the itinerary will change. For example, a member of the group will be running behind therefore requiring a change in the itinerary. As such, a notification that an itinerary change is imminent or already has been made can be transmitted to the other vehicles. The itinerary is adjustable (e.g., at the central location 190) and made available to the vehicles 300, 302, 304, 306 to reflect the change(s).

In one embodiment, the travel information includes road condition information. The road condition information includes factors that are impeding the flow of traffic along a route. Factors that impede traffic flow include, but are not limited to, reduction of posted speed limits, traffic incidents, accidents, weather conditions, lane and road closures, construction, and other planned or unplanned events impeding the flow of traffic. This information is typically useful to the travel group 320 for planning an alternate route or for other purposes. The information can also be relayed to/from the central location 190 to coordinate re-routing efforts.

In one embodiment, the travel information includes miscellaneous information. The miscellaneous information is related to the status or progress of the travel group 320. Alternatively, the miscellaneous information provides means for communicating between members of the group or information from the central location 190.

In one embodiment, the leader vehicle 300 is the primary contact for travel information and is contacted first for any updates. In another embodiment, the central location 190 is the primary contact for travel information and is contacted first for any updates. Further, the central location 190 monitors for certain conditions and send travel information when appropriate. The method terminates at step 270 and is repeated at any step as required.

Those skilled in the art will recognize that step(s) may be eliminated, added, or modified in accordance with the present invention. Further, it will be appreciated that the vehicle identification, group formation, travel information and its dissemination may vary from the examples provided herein. The present invention may be embodied in other specific forms without departing from the spirit or essential characteristics. The described embodiments are to be considered in all respects only as illustrative and not restrictive.

While the embodiments of the invention disclosed herein are presently considered to be preferred, various changes and modifications may be made without departing from the spirit and scope of the invention. The scope of the invention is indicated in the appended claims, and all changes that come within the meaning and range of equivalents are intended to be embraced therein.

What is claimed is:

1. A method of navigating a plurality of vehicles, the method comprising:
    receiving vehicle identifications from the plurality of vehicles at a central location;
    receiving a request to form a travel group, the travel group being an unordered pack of the plurality of vehicles, and the request specifying at least one vehicle authorized to join the travel group;
    forming the travel group based on the received vehicle identifications in response to the request;
    receiving global positioning information from at least one of the vehicles associated with the travel group at the central location;
    transmitting the received global positioning information and travel information from the central location to at least one of the vehicles associated with the travel group; and
    transmitting additional travel information from any or all vehicles to any or all other vehicles associated with the travel group, each of the vehicles associated with the travel group being able to access and share, with any or all of the other vehicles associated with the travel group, the travel information from the central location and the additional travel information from any or all of the other vehicles.

2. The method of claim 1 wherein the travel group request is received at the central location, and wherein the method further comprises:
    associating a plurality of the received vehicle identifications based on the travel group request.

3. The method of claim 1, further comprising verifying at least one of the vehicle identifications.

4. The method of claim 1 wherein the forming of the travel group comprises:
    stipulating a leader and at least one follower.

5. The method of claim 4 wherein during traveling of the travel group, the method further comprises:
    i) physically passing the leader by one of the at least one follower, or ii) designating, by the leader, that the leader no longer desires to be the leader; and
    in response to the physically passing or the designating, switching positions of the leader and the one of the at least one follower, whereby the leader becomes a follower and the one of the at least one follower becomes the leader.

6. The method of claim 1 wherein the central location is a web-hosting portal or a call center.

7. The method of claim 1 wherein the travel information is selected from a group consisting of an estimated time of arrival of a travel group vehicle, directions, distance between travel group vehicles, a route, an itinerary, road conditions, and miscellaneous information.

8. The method of claim 7 wherein the travel information is transmitted upon receiving a travel information request.

9. The method of claim 7 wherein the travel information is sent automatically.

10. A computer usable medium including a program for navigating a plurality of vehicles, the computer usable medium comprising:
    computer readable program code for receiving vehicle identifications from the plurality of vehicles at a central location;
    computer readable program code for receiving a request to form a travel group, the travel group being an unordered pack of the plurality of vehicles, and the request specifying at least one vehicle authorized to join the travel group;
    computer readable program code for forming the travel group based on the received vehicle identification in response to the request;
    computer readable program code for receiving global positioning information from at least one of the vehicles associated with the travel group at the central location;
    computer readable program code for transmitting the received global positioning information and travel information from the central location to at least one of the vehicles associated with the travel group; and
    computer readable program code for transmitting additional travel information from any or all vehicles to any or all other vehicles associated with the travel group, each of the vehicles associated with the travel group being able to access and share, with any or all of the other vehicles associated with the travel group, the travel information from the central location and the additional travel information from any or all of the other vehicles.

11. The computer usable medium of claim 10, wherein the travel group request is received at the central location, and wherein the computer usable medium further comprises:
    computer readable program code for associating a plurality of the received vehicle identifications based on the travel group request.

12. The computer usable medium of claim 10, further comprising computer readable program code for verifying at least one of the vehicle identifications.

13. The computer usable medium of claim 10, wherein the computer readable program code for forming the travel group comprises computer readable program code for stipulating a leader and at least one follower.

14. The computer usable medium of claim 13, further comprising computer readable program code for switching positions of the leader and one of the at least one follower during traveling of the travel group, the switching positions occurring in response to i) physically passing the leader by the one of the at least one follower, or ii) designating, by the leader, that the leader no longer desires to be the leader.

15. The computer usable medium of claim 10, wherein the travel information is selected from a group consisting of an estimated time of arrival of a travel group vehicle, directions, distance between travel group vehicles, a route, an itinerary, road conditions, and miscellaneous information.

16. The computer usable medium of claim 15, wherein the travel information is transmitted upon receiving a travel information request.

17. The computer usable medium of claim 15, wherein the travel information is sent automatically.

18. A system for navigating a plurality of vehicles, the system comprising:

means for receiving vehicle identifications from the plurality of vehicles at a central location;

means for receiving a request to form a travel group, the travel group being an unordered pack of the plurality of vehicles, and the request specifying at least one vehicle authorized to join the travel group;

means for forming the travel group based on the received vehicle identifications in response to the request;

means for receiving global positioning information from at least one of the vehicles associated with the travel group at the central location;

means for transmitting the received global positioning information and travel information from the central location to at least one of the vehicles associated with the travel group; and means for transmitting additional travel information from any or all vehicles to any or all other vehicles associated with the travel group, each of the vehicles associated with the travel group being able to access and share, with any or all of the other vehicles associated with the travel group, the travel information from the central location and the additional travel information from any or all of the other vehicles.

* * * * *